US012664310B1

(12) United States Patent
Zhou et al.

(10) Patent No.: US 12,664,310 B1
(45) Date of Patent: Jun. 23, 2026

(54) PRIVACY SAFE PROTOCOL IN CLEAN ROOM ENVIRONMENT

(71) Applicant: Amazon Technologies, Inc., Seattle, WA (US)

(72) Inventors: Chuandong Zhou, Westminster, CO (US); Pramod Varma, Boulder, CO (US)

(73) Assignee: Amazon Technologies, Inc., Seattle, WA (US)

( * ) Notice: Subject to any disclaimer, the term of this patent is extended or adjusted under 35 U.S.C. 154(b) by 248 days.

(21) Appl. No.: 18/542,372

(22) Filed: Dec. 15, 2023

(51) Int. Cl.
*G06F 21/62* (2013.01)

(52) U.S. Cl.
CPC ...... *G06F 21/6254* (2013.01); *G06F 21/6209* (2013.01)

(58) Field of Classification Search
CPC .......................... G06F 21/6254; G06F 21/6209
See application file for complete search history.

(56) References Cited

U.S. PATENT DOCUMENTS

| | | | | |
|---|---|---|---|---|
| 11,651,287 | B1 * | 5/2023 | Kostakis | G06F 8/61 706/12 |
| 2023/0004670 | A1 * | 1/2023 | Langseth | H04L 67/568 |
| 2023/0259787 | A1 * | 8/2023 | David | G06N 3/0455 706/15 |
| 2024/0143838 | A1 * | 5/2024 | Ardhanari | G16H 30/40 |
| 2024/0394389 | A1 * | 11/2024 | Wen | G06V 20/46 |
| 2025/0138986 | A1 * | 5/2025 | Bazzo | G06F 11/362 |

OTHER PUBLICATIONS

Sean C.D. Zhou et al. 'Clean Room for Advertising Optimization' (Year: 2022).*

* cited by examiner

*Primary Examiner* — Andrew Suh
(74) *Attorney, Agent, or Firm* — Davis Wright Tremaine LLP

(57) ABSTRACT

Systems and methods are described relating to performing various operations on third party data, including sensitive information, in a secure computing environment and enforcing privacy controls on the resulting data and metrics thereof prior to outputting that data. In some aspects, an isolated computing/execution environment may obtain execution logic from a client device for generating result data based on input data and input data. The execution logic may be executed in the isolated execution environment using the input data to generate result data and performance metrics data relating to the execution logic. A set of privacy constraints may be enforced on the result data and the performance metrics data prior to causing the result data and the performance metrics data to be accessible by the client device.

20 Claims, 8 Drawing Sheets

500

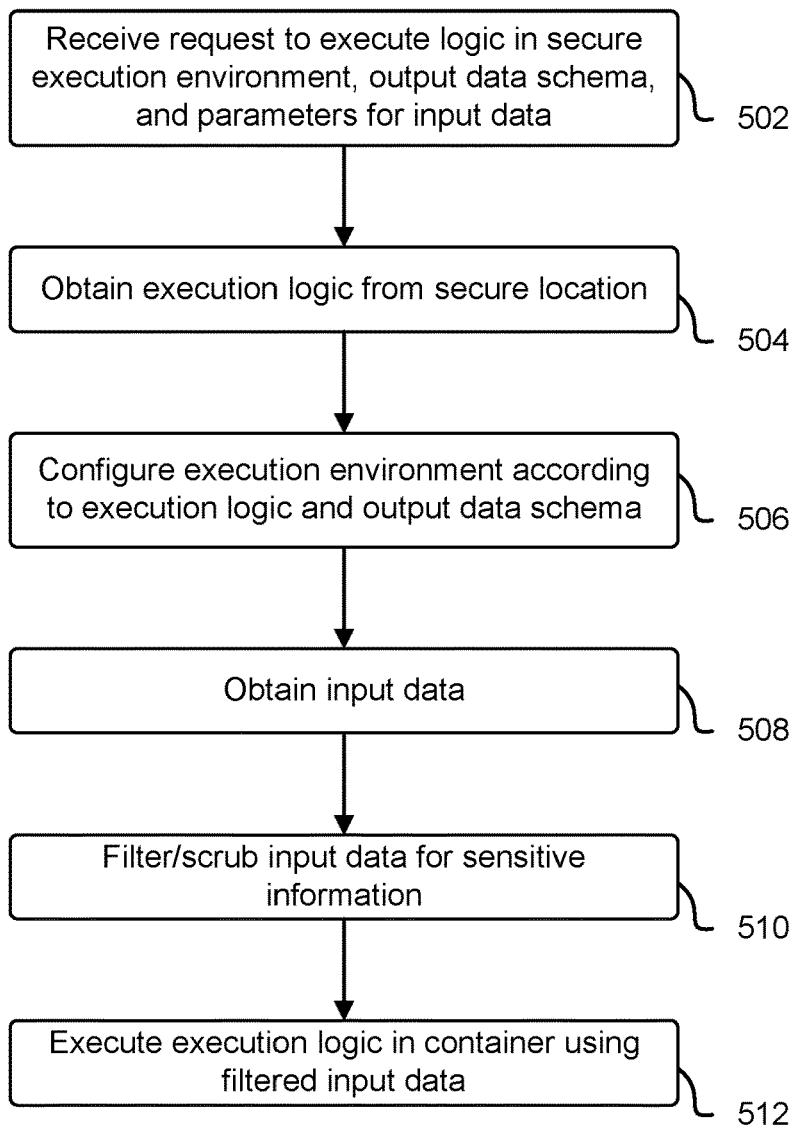

Receive request to execute logic in secure execution environment, output data schema, and parameters for input data — 502

Obtain execution logic from secure location — 504

Configure execution environment according to execution logic and output data schema — 506

Obtain input data — 508

Filter/scrub input data for sensitive information — 510

Execute execution logic in container using filtered input data — 512

Network

Application
Server(s)

806

Web
Server(s)

808

Production

Data Privacy
Integration
Service 104

Log

User
Information

810

812

814

816

PRIVACY SAFE PROTOCOL IN CLEAN ROOM ENVIRONMENT

BACKGROUND

Many businesses and computerized systems generate vast amounts of data that includes private information, such as personal identifying information (PII). This data can be useful for performing various analytics, including relating to market research, consumer demand, advertising, among just a few of a variety of uses. However, because this data typically includes PII and/or other sensitive information, making it available for performing analytics challenging, particularly for users and systems that did not generate the data in the first instance. These challenges can include negotiating rights to data between entities, scrubbing the data of sensitive information while still trying to retain enough information to enable the results of various analytical operations performed on the data to yield useful results, and custom fitting or selecting data for specific purposes. Given the importance of data privacy, there is a need to create systems to use this data while maintaining data privacy.

BRIEF DESCRIPTION OF THE DRAWINGS

Various techniques will be described with reference to the drawings, in which:

FIG. 5 illustrates an example process for configuring a secure execution environment for performing operations on third party data, according to at least one embodiment;

DETAILED DESCRIPTION

Figure 1:
FIG. 1 illustrates an example of a data privacy integration service that enables performing operations on third party data and generating privacy compliant results and metrics, according to at least one embodiment.

Systems and methods are described herein for performing various operations on third party data, including sensitive information, in a secure computing environment and enforcing privacy controls on the resulting data and metrics thereof prior to outputting that data. In some aspects, a data privacy integration service may obtain execution logic from a customer for performing on various input data, such as may be from one or more third parties. In some instances, the execution logic may include one or more machine learning models for generating inference data given a set of input data. In various cases, the data privacy integration service may isolate both the execution logic and the input data from other actors or users, to provide a secure execution environment for performing operations on the input data (e.g., in a software container), to generate results data (inference data and/or model parameters in the case of an ML model) and performance metrics data relating to the execution of the logic supplied by the customer. A customer may configure the execution environment by specifying an output data schema to be used for the results data, parameters of performance metrics data that may be generated based on execution of the execution logic, and/or parameters of the input data to be used. The data privacy integration service may obtain input data from a repository (e.g., which may include third party data), and perform actions specified in the execution logic on the input data in a secure execution environment to generate results data and performance metrics data. The data privacy integration service may then implement one or more privacy controls to the results data and/or the performance metrics data prior to making the results and performance metrics data available to the customer. In some examples, the results data and/or performance metrics data may be provided by one or more interfaces, such as provided by the data privacy integration service. The interface may modify the results data and/or performance metric data to further enforce one or more privacy controls before granting access to the end customer. In this way, data available to various users may be drastically increased for performing analytics and various operations on the data, while data privacy controls can still be enforced on the resulting data and performance metrics.

In some aspects, a data privacy integration service may implement privacy controls in a number of different ways, and/or using different techniques between the results or inference data and performance metrics data coming out of the execution environment. In some examples, the output data schema, provided by the customer, may be examined to determine if it anonymizes results data to an acceptable degree (e.g., enough data aggregation is performed). In other examples, correlations may be determined between the input data and output data, where too much correlation may be rejected as not satisfying one or more privacy criteria. In various cases, generalization error and loss values of the results data may be determined and compared to one or more thresholds, to ensure differential privacy is maintained to an acceptable degree. In some aspects, ML model privacy risks may be evaluated using a binary classifier model to determine if the output presents an unacceptable privacy risk, whereby the results may be withheld or the ML model adjusted to ensure compliance.

In yet some cases, noise or inert data may be injected into one or both of the input data and/or output data to further increase differential privacy. In yet some instances, the output results may be compared to a privacy criteria, such as including anonymization, diversity, and/or differential privacy requirements, and the results data may be modified (anonymized or noise added) to meet that criteria. In some examples, the performance metrics data may be obfuscated to ensure data privacy compliance.

In some aspects, the described techniques may be used to perform analytics of Multi-Touch Attribution (MTA) data in a privacy safe clean room execution environment. The described techniques may provide a clean room that is a privacy safe environment where multiple adversarial parties can share their user level event data. In some examples, advertising companies and systems may access clean room data from publishers for business insight and campaign optimization. The clean room services may implement protocols to enforce access that is privacy safe on user level data. In some cases, the results data may be aggregated to protect privacy, such as via queries performed on the results data. In some cases, MTA analysis may benefit from machine learning (ML) training on user level data in the clean room, where egress of the privacy safe ML model weights and evaluation metrics may be provided to advertisers from the clean room environment.

In various examples, the proposed protocol may enforce privacy safety for data, including, MTA, in the clean room environment. Model weights, e.g., the attribution factors, for each user, may be stored as a standalone table. The described techniques may then apply the privacy safety protocol to egress aggregated attribution factors to a customer. For model performance evaluation metrics, the described techniques may obfuscate numerical values before egress. In some aspects, the protocol may also define a handshake process to define data schemas between adversarial entities.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) increased data security for performing analytics on third party data; (2) more efficient utilization of computing resources in enforcing data privacy for multi-user environments; and (3) other benefits and advantages as will be described and made apparent in the description below.

FIG. 1 illustrates an example 100 of a data privacy integration service 104 that may enforce privacy constraints or controls 114 on data output, such as anonymized inference data 118 and/or obfuscated performance metrics data 120, from a secure execution environment 122. As illustrated, data privacy integration service 104 may provide a secure execution environment 122, which may be a software container., virtual computing machine, or other type of computing environment abstraction that restricts access to data within the execution environment.

As illustrated, the data privacy integration service 104 may obtain customer logic 116 from a user 102 that specifies operations to be performed on data, such as may be generated and managed by one or more third parties, such as input data 124 from a data repository 106. In some cases, user 102 may provide additional configuration parameters relating to performing actions specified in the customer logic 116, such as an output data schema, defining what data is output from the customer logic, various parameters of what type of input data is to be used, and various other parameters, as will be described in greater detail below.

Based on the logic and various parameters provided by user/customer 102, the data privacy integration service 104 may instantiate a secure execution environment, such as a software container, 122. The secure execution environment 122 may obtain input data 124 from a data repository or other source of data, such as may or may not be under the control of or associated with the data privacy integration service 104. In some cases, the secure execution environment 122 may remove sensitive data from the input data, such as unnecessary user identifiers, sensitive information that may not be useful to the customer supplied logic 116, etc., via a sensitive data removal component or process 108. As illustrated, the sensitive data removal component or process 108 may be executed within the secure execution environment 122 to ensure that no private data is exposed outside of the secure execution environment 122. The secure execution environment 122 may execute the customer provided logic 116 on the input data and generate inference data 110 and in some cases, performance metrics data 112, which may include various metrics concerning the execution of the customer logic, such a Receiver Operator Characteristic (ROC) curves, area under the ROC curve (AUC), Confusion Matrix, $R^2$, MAPE, etc., when the customer logic 116 includes one or more machine learning (ML) models.

In various cases, the data privacy integration service 104 may enforce or apply privacy controls on the inference or results data 110 and the performance metrics data 112 prior to releasing that data to user 102. In some cases, the privacy controls 114 may be implemented by or within the secure execution environment 122, as illustrated. In other cases the privacy controls 114 may be implemented by the data privacy integration service 104, such as in a separate execution environment instance. Various privacy controls may be enforced by the privacy controls component or process 114, such as based on the data being generated by execution of the customer logic 116, characteristics of the performance metrics data being generated, based on the input data, based on relationships between the input data and the output data (e.g., correlation), etc. In some cases, one or more of anonymization, diversification, and/or adding noise to increase differential privacy may be implemented on one or both of the results/inference data or the performance metrics to produce, for example anonymized inference data 118 and obfuscated performance metrics data 120 that may be made accessible to user 102. In some cases, the data privacy integration service 104 may provide an interface, such as a user interface (UI) or graphical user interface (GUI) to user 102, to enable them to access the anonymized inference data 118 and/or the obfuscated performance metrics data 120. In some cases, the UI or GUI may apply the one or more privacy controls 114, such as by adding a layer of processing and modifying the results data/performance metrics data (e.g., anonymizing it, obfuscating it, aggregating results, etc.), prior to presenting that data to the user 102.

Figure 2:
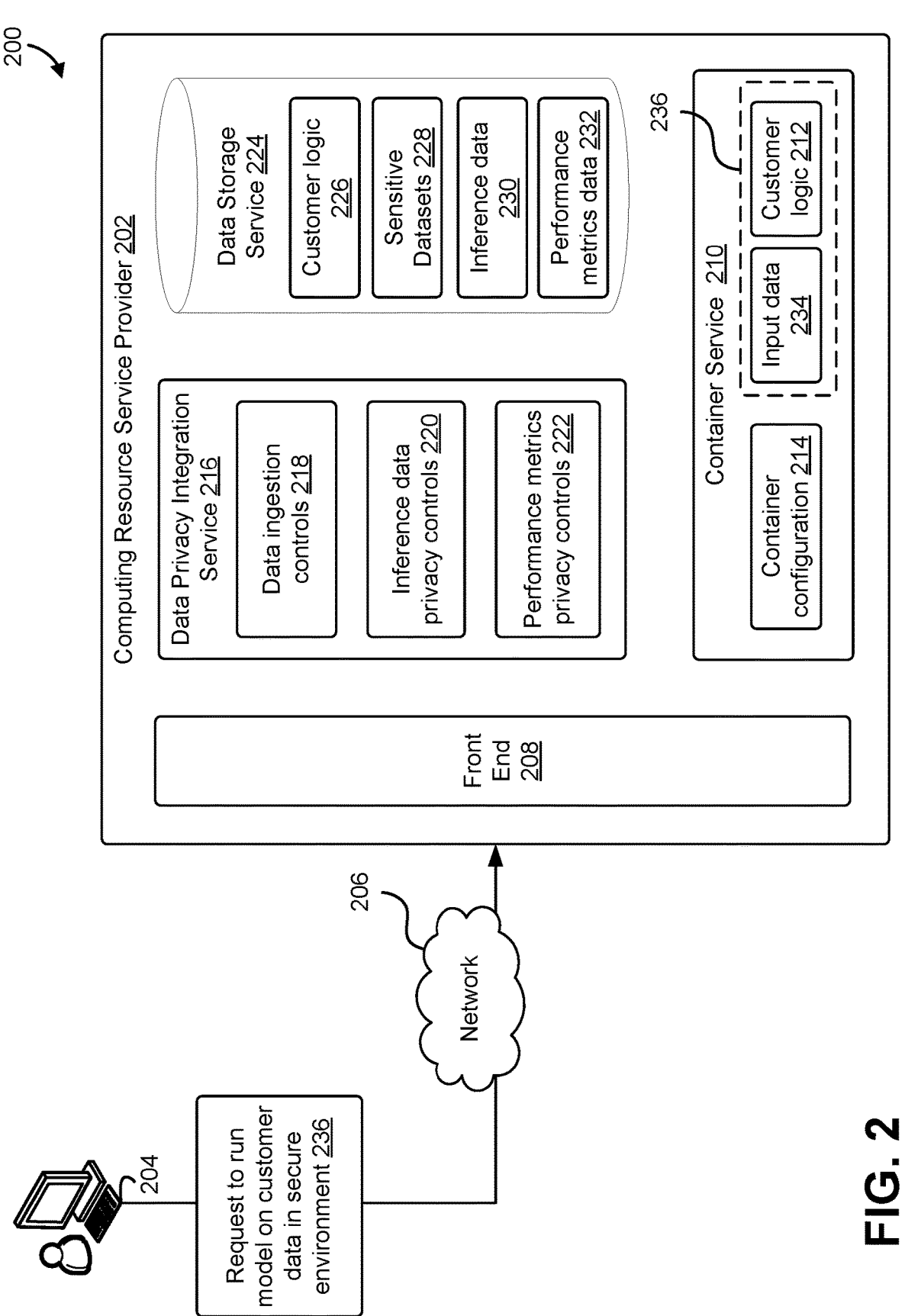
FIG. 2 illustrates an example environment in which the described techniques can be practiced, according to at least one embodiment.

FIG. 2 illustrates an example environment 200 in which a data privacy integration service 216 may be implemented by a computing resource service provider 202. As illustrated, the data privacy integration service 216 may be an example of and/or include one or more aspects of the data privacy integration service 104 described above in reference to FIG. 1. In various examples, the data privacy integration service 216 may interface with the container service 210 to provide secure execution environments where various operations can be performed on the data and results provided while ensuring privacy compliance of the output data.

The data privacy integration service 216 and the container service 210 may interact with various other computer-implemented services, such as one or more of a front end 208, and/or a data storage service 224 to provide a secure execution environment where user supplied logic/instructions can be executed on sensitive datasets 228, such as may include third party data, to provide results data and performance metric data that are privacy compliant. Various client computing devices 204 may interact with the computing resource service provider 202 through one or more networks 206 to access this functionality.

Client 204 may refer to a client computer system or computing device connected to a server (e.g., computing resource service provider) over a network 206. In some cases, client 204 refers to a user or operator of a client computer system and may be an employee of an organization that utilizes a computing resource service provider 202 to interact with various forms of data, such as through one or more of a front end 208, data privacy integration service 216, container service 210, and/or a data storage service 224.

In some cases, the front end 208 may receive a request 236 to run customer provided logic/a model on other customer data in a secure environment and direct it to the appropriate service. The front end 208 may be a system including a set of web servers (e.g., a single web server or a set of web servers which may be managed by a load balancer) provided by the computing resource service provider 202. Web servers of the front end 208 may be configured to receive various requests and data and to process them according to one or more policies associated with the service. In some examples, device 204 may use client software that is configured to establish a client-server relationship with a service of a computing resource service provider 202. A client 204 may connect to a service via front end 208, which receives requests from clients and routes them to backend services. Front end 208 may interface with one or more of a data privacy integration service 216, a container service 210, and/or a data storage service 224 and/or other services offered by a computing resource service provider 202 to its customers. In at least one embodiment, client 204 interacts with a GUI to interact with various data provided by or through the computing resource service provider 202, and client-side software translates the GUI setup to a web service API request which is transmitted from the client computer system 204 to front end 208 via a network 206. In an embodiment, the network 206 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 206 is enabled by wired and/or wireless connections and combinations thereof. In some cases, a network may include or refer specifically to a telephone network such as a public switched telephone network or plain old telephone service (POTS).

The computing resource service provider 202 may provide various services such as data processing, data storage, software applications, security, encryption, and/or other such services. A computing resource service provider 202 described herein may be implemented using techniques described below in reference to FIG. 8. The computing resource service provider 202 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 202 may provide data storage through a data storage service 224 to store and manage large volumes of data, including text, image, and other data. The data storage service 224 may store various data, such as may be organized into various groups, such as customer provided logic (e.g., which may include container images, ML models, etc.), sensitive datasets 228, which may include various data collected from various sources that may or may not contain sensitive information, inference/results data 230, which may be generated by execution of the customer provided logic, and/or performance metrics data 232 which may be related to execution of the customer provided logic. In some aspects, the data storage service 224 may store various data used and/or modified by data privacy integration service 216 and the container service 210 effectuate implementing privacy controls inference/results data 230 and/or performance metrics data 232.

Customer logic 226 may include various instructions, logic, container images, ML models, various other models including neural networks, et., taking any of a variety of formats and in any of a multitude of different languages. In various cases, the customer logic may be provided by customer 204 and may be stored by data storage service 224, such as isolated from access by other users and systems, via any of a variety of known techniques (e.g., in the case the customer logic is secret or proprietary).

Sensitive datasets 228 may include various forms of data, such as may be in tabular or relational data structures (e.g., organized into columns and rows). Sensitive datasets 228 may be generated by or ingested by various systems and services provided by the computing resource service provider 202, such execution environment or containers provided by the container service 210. Sensitive datasets 228 may include datasets that include sensitive data, such as any type of data that a user or entity would desire to keep private. In some cases, the sensitive data of a sensitive dataset 228 may be positively identified prior to the data being stored by the data storage service, such as based on the data itself, an origin of the data, a type of service that generated the data (e.g., healthcare data service), and so on. In yet some cases, the sensitive dataset 228 may be a set of data that may include sensitive information, but which has not been actively classified as actually containing sensitive data. In various cases, sensitive datasets 228 may be provided by various users or customers, gathered and collected by the computing resource service provider 202 and stored in secure storage, such as may be provided by data storage service 224 or another data storage service or system.

In various cases, the inference data 230 may be results generated from execution of the customer logic 226 on one or more sensitive datasets 228. In some cases, the results may take the form of actual inference data, or may take the form of tuning parameters for a given ML model. In either case, the inference/results data may include sensitive information from the sensitive dataset 228 used as an input. Similarly, the performance metrics data 232 may be results relating to execution of the customer logic 226 on one or more sensitive datasets 228, such as including, for example, ROC curves, AUC metrics, Confusion Matrix, $R^2$, MAPE, etc., when the customer logic 226 includes one or more ML models.

Data storage service 224 may be an on-demand data storage service, such as an object-based data storage service that services API requests to store and retrieve data objects synchronously, and may be configured to store various forms of data and media, and other data structures generated and updated by data privacy integration service 216 and the container service 210. The data storage service 224 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 224, may be organized into data objects, in one or more logical data containers. The data storage service 224 may include one or more data objects, which may have arbitrary sizes and may, in some instances, have constraints on size. Thus, the data storage service 224 may store numerous data objects of varying sizes. The data storage service 224 may operate as a key value store that associates data objects with identifiers of the data objects which may be used by the data privacy integration service 216 and/or the container service 210 to retrieve or perform other operations in connection with the data objects stored by the data storage service 224. Access to the object-based data storage service 224 may be through application programming interface (API) calls to the service or via an interface, such as a graphical user interface (GUI). Access to the data storage service 224 may be through application programming interface (API) calls to the service, for example from client device 204 directly or through the computing resource service provider 202 and/or front end 208.

It should be appreciated that the data storage service 224 may additionally or alternatively provide non-object based data storage, such as block data storage, table-oriented data storage, relational databases, file-based storage, and the like. The data storage service 224 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost-effective storage class that may provide access with some delay, different redundancy, or other attributes.

The computing resource service provider 202 may provide a data privacy integration service 216. The data privacy integration service 216 may be a collection of computing resources, including physical resources, virtual resources, or combinations thereof, configured to obtain sensitive data, initiate performance of customer directed operations on the data in one or more containers/secure execution environment, and produce results/inference data that are privacy compliant. In various cases, the data privacy integration service 216 may obtain a request 236 to perform operations on sensitive data, such as third party data, from a user. The data privacy integration service 216 may provide a data ingestion controls component or process 218 that may select which data, such as from a variety of sensitive datasets 228, to use for a given request. In some cases, the input data selected may be selected based on characteristics of the requested operations (e.g., defined in the customer logic 226), such as data including certain fields useful or necessary for the requested operation. In some aspects, the sensitive dataset(s) 228 selected may include multi-touch attribution data (MTA) data, that includes browsing history and user interactions with various media in that browsing history leading up to a purchase of goods or services. In these instances, the data ingestion controls 218 may select MTA information relating to certain types of products of services (e.g., a streaming service, a physical product, a subscriptions service, etc.), spanning a certain time period, across different selections of platforms, websites, and so on. In some cases, one or more of these attributes of the input data may be specified in the request 236. The data ingestion controls component or process 218 may determine what data to obtain and where from. It may then coordinate with the container service 210 to effectuate a secure execution environment or software container (e.g., also referred to herein as a container or compute instance) obtaining that data (e.g., sensitive dataset(s) 228) in secure way. In some aspects, the data ingestion controls component or process 218 may first remove sensitive information or identifying information from the sensitive dataset(s) 228 that is not needed for the customer logic (e.g., user identifiers, other sensitive information that may not be useful such as financial information, and so on). In other cases, the data ingestion controls 218 may be implemented within a container to increase data security, such as via communication between the data privacy integration service 216 and the container service 210.

The data privacy integration service 216 may also provide inference or results data privacy controls 220 and performance metrics privacy controls 222, which may be components or processes that apply various privacy criteria to the data output by the container before it is made accessible to customer 204. These controls 220, 222 may be implemented by the data privacy integration service 216, such as upon receiving output data from a container provided by the container service 210, or may be implemented in the container in which the customer logic was executed. These controls 220, 222 may include various controls for ensuring the output data and metrics are privacy compliant, such as by comparing the inference data 230 and/or performance metrics data 232 to privacy controls, and modifying the inference data 230 and/or performance metrics data 232 as needed to meet the privacy criteria. In some cases, this may include anonymity, diversity, and/or differential privacy criteria. In yet some cases, the criteria may be specific to the input data, the logic performance, and/or the specific format of the inference or results data or performance metrics data. In some cases, the privacy controls may be specific to ML model outputs, such as may be provided in the customer logic 226, as will be described in greater detail below.

The computing resource service provide may provide a container service 210. The container service 210 may be a collection of computing resources, including physical resources, virtual resources, or combinations thereof, that configure and provide software containers or compute instances, such as compute instance 236 for various purposes, including executing customer logic 212 on input data 234 in a secure environment. In various examples, the container service 210 may interact with the data privacy integration service 216 to configure compute instances to execute customer logic on various input data and output results/inference data and performance metrics data while complying with privacy constraints. The container service 210 may isolate customer logic 212 and the input data 234 for a given task via separate compute instances or containers 236 for each request from other actors or accesses. As illustrated, customer logic 212 may be an example of customer logic 226. In some cases, the customer logic 212 may not be stored by the computing resource service provider 202 apart from the compute instance 236. The containers provided by container service 210 may be configured via configuration parameters 214, such as may be manually defined by a user or the data privacy integration service 216, or may be automatically defined by the container service, such as in the examples where the container service manages multiple running compute instances and may select an appropriate compute instance based on the parameters of request 230.

A container (also referred to as a "software container" or "compute instance") may be a lightweight virtual machine instance running under a computer system instance that includes programs, data, and system libraries. When the container is run (or executed), the running program (i.e., the process) is isolated from other processes running in the same computer system instance. Thus, containers may each run on an operating system (e.g., using memory, CPU, and storage allocated by the operating system) of the container instance (e.g., a virtual machine or other computing system) and execute in isolation from each other (e.g., each container may have an isolated view of the file system of the operating system). Each of the containers may have its own namespace, and applications running within the containers are isolated by only having access to resources available within the container namespace. Thus, containers may be an effective way to run one or more single applications within their own namespace. A container encapsulation system allows one or more containers to run within a single operating instance without overhead associated with starting and maintaining virtual machines for running separate user space instances.

The containers may be launched to have only specified resources from resources allocated to the container instance; that is, a container may be launched to have a certain amount of memory and to not utilize more than a specified amount of processing power. For example, a task definition may specify two CPUs, but that the container for an application cannot exceed 50% of those two CPUs. The resource allocation for the containers may be specified in the task definition. Multiple containers may run simultaneously on a single host computer or host container instance, and the resources of the host can be allocated efficiently between the containers using this system. In an embodiment, a host supports running containers in container instances from only one customer (referred to herein as a "single-tenant" environment). In other embodiments, a single host may allow multiple customers to have container instances running on the host (referred to herein as a "multi-tenant" environment). In the latter case, the container service may provide security to ensure that the customers are unable to access containers, clusters, or container instances of the others.

In other examples, virtual computing systems or virtual machines (VMs) (or separate physical computing systems in some cases) that include operating systems, processors and memory to execute customer logic within a secure environment may be used in place of or in conjunction with containers, as described above, to execute customer logic in a secure environment. In various cases, one or more of the data ingestion controls 218, inference data privacy controls 220, and/or performance metrics privacy controls 222 may be implemented in a container or virtual machine of a given task. In some cases, one or more of the data ingestion controls 218, inference data privacy controls 220, and/or performance metrics privacy controls 222 may be run as separate functions within a container or virtual machine, such that the functions may be standardized and/or provided by a serverless compute service. A serverless compute service (not illustrated) may be a collection of computing resources, including physical resources, virtual resources, or combinations thereof, that provide execution environments for various functions. A serverless compute service may be serverless in the sense that computing resources are dynamically allocated to perform functions (also referred to as serverless compute functions, serverless functions, Lambda functions) triggered by the events such as invocation of an endpoint from a client (e.g., a web API call via a network such as the Internet). In an embodiment, a serverless compute function is triggered when a serverless compute endpoint is invoked and computing resources in which the function can run are provisioned in response to the trigger being detected. Note, however, that embodiments of the present disclosure need not be limited to use with serverless compute services, but may also be implemented on some other virtual computing service platform, such as a software container service or virtual computer system service.

Figure 3:
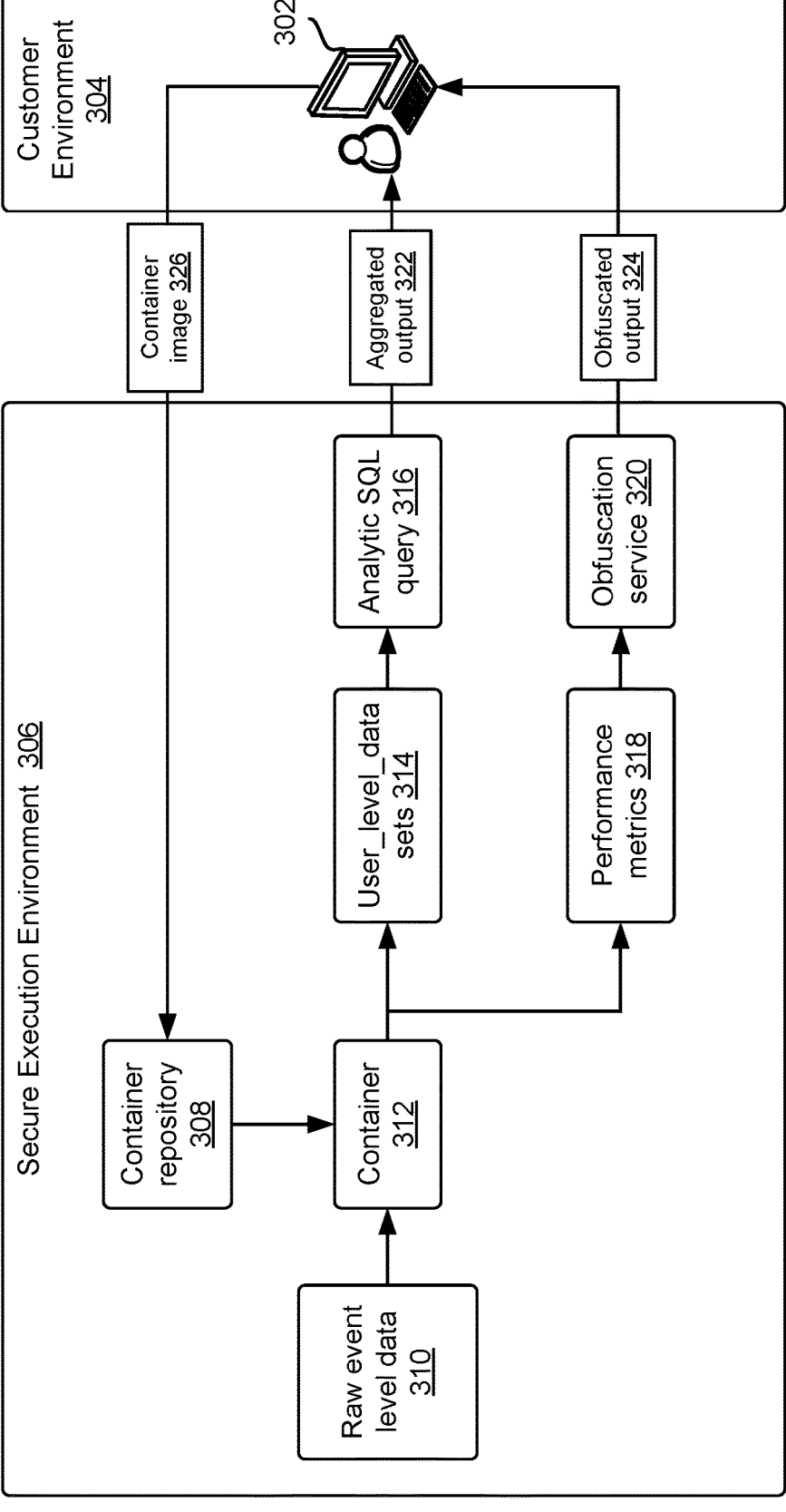
FIG. 3 illustrates an example of a data privacy integration service, according to at least one embodiment.
Figure 4:
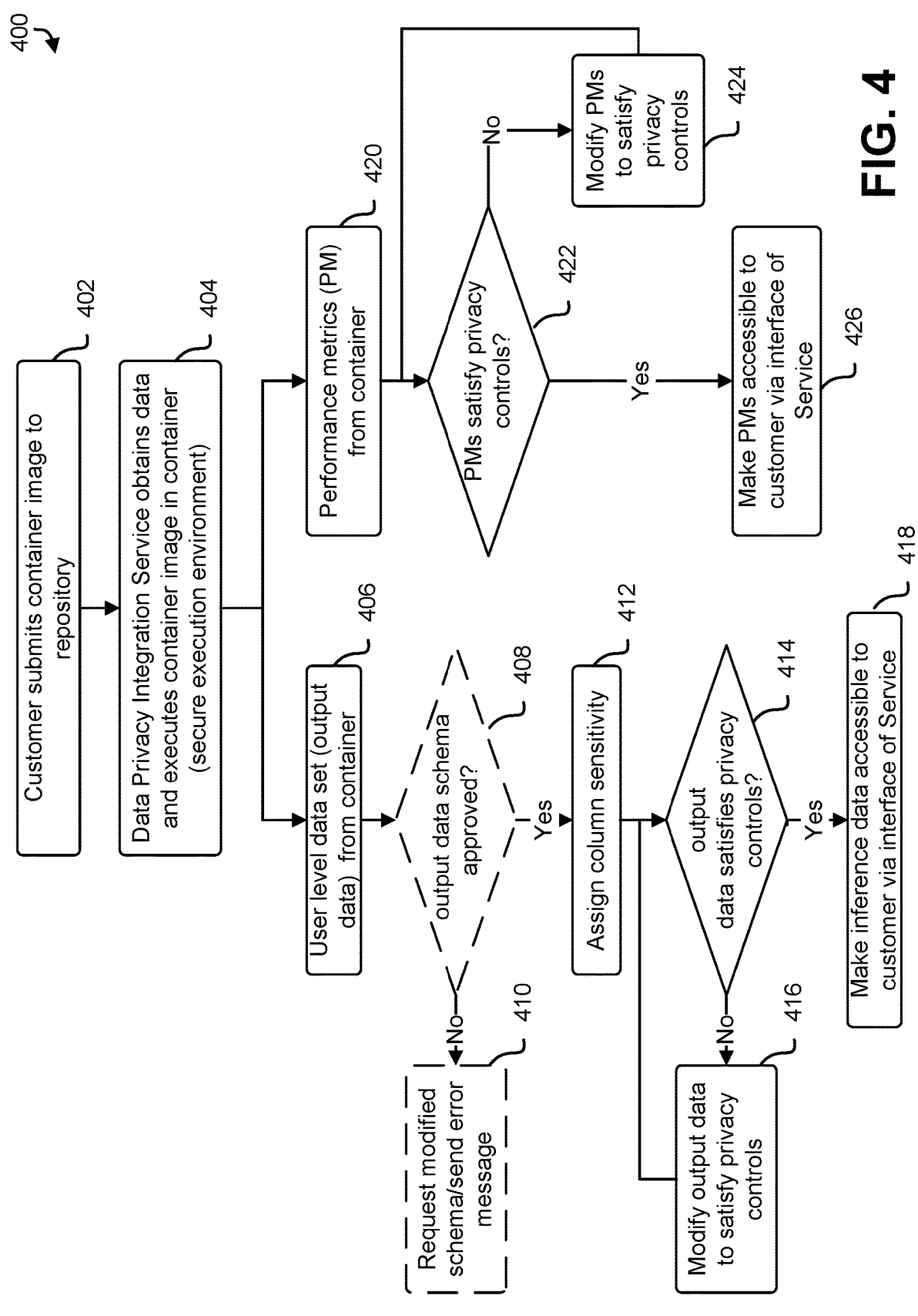
FIG. 4 illustrates an example process for performing operations on third party data and generating privacy compliant results and metrics, according to at least one embodiment.

FIG. 3 illustrates an example 300 of a secure execution environment 306 interacting with a customer 302 within a customer environment 304. As illustrated, the secure execution environment 306 may be an example of secure execution environment 122, 236 provided by a data privacy integration service 104, 216 and/or a container service 210 described above in reference to FIGS. 1 and 2. The various entities sand components of example 300 will be described in reference to process 400 illustrated in FIG. 4. It should be appreciated that process 400 is only given by way of example, and that permutations and modification thereof are contemplated herein.

Process 400 may begin at operation 402, in which a customer, such as customer 302 operating in a customer environment 304 submits operations, such as in some cases may include logic and/or be contained within a container image 326, to a container repository 308. In various cases, a container image may be an unchangeable, static file that includes executable code so it can run an isolated process. A container image may include system libraries, system tools and other platforms settings a software program uses to run on a containerization platform, such as may be provided by a container service 210. The data privacy integration service may then obtain input data (e.g., raw event level data 310) and execute the image container in a container 312, at operation 404. The container 312 may generate, in some examples, two channels of data, user level data sets 314, which may be results from produced from executing instructions/ML models within the container image in the container 312 on the raw event level data 310, and performance metrics 318, represented by operations 406 and 420 respectively.

As illustrated in FIG. 3, customer 302 may access the user level data sets/results data 314 from the container 312 via performing a query on the results data, represented by analytic SQL query at operation 316, at which point the customer 302 can access aggregated output or otherwise privacy compliance data 322 from the results data 314. In some cases, processes may be implemented for receiving a query from the customer and only providing privacy compliant results based on the user level data sets 314. In some cases, one or more privacy compliance operations may be captured via operations 408-418 of process 400.

In some cases, the customer may specify an output data schema, either in the original request, or through a query request to access the results data. In these cases, the output data schema may be analyzed, at operation 408, to determine if it meets anonymization or aggregation rules (e.g., aggregates over a threshold number of entries, for example, such that individual input entries may not be identified from the results). If not, then an error message may be sent/the parameters/or data adjusted (e.g., anonymized) to ensure data privacy compliance, at operation 410. In various examples, the output data schema may include the name and datatype of all columns from the container output, including userId. An example of a output data schema is provided below:

userId: string, aggregation_dimension_1: string, aggregation_dimension2: int, coef_1: double, coef_2: double, p_value_1: float}

If the output data schema does pass the initial criteria, then column sensitivity or aggregation threshold may be assigned to one or more columns of the results data, where the sensitivity may specify a minimum number of results that are aggregated together, at operation 412. In some examples, each column of the results data may be classified into a category below based on the combination of the aggregation threshold and filtering restrictions.

In various cases, the results data may also be compared to one or more other privacy standards, such as k-anonymity, L-diversity, and/or one or more differential privacy criteria, at operation 414. If the data does not meet the criteria, the results data may be modified (e.g., suppressed, generalized, or otherwise modified, such as by injecting noise into the results data) to satisfy the privacy controls, at operation 416. Process 400 may continue to loop through operations 414 and 416 until all the privacy controls or criteria are satisfied, at which point the results data (e.g., aggregated output 322) may be made accessible to the customer 302. In other cases, other privacy controls or criteria may be used, such as are known in the art and described in other sections of this disclosure, such as in reference to FIGS. 6 and 7 below.

As also illustrated in FIG. 3, customer 302 may access obfuscated output or otherwise privacy compliance performance metrics 324 relating to execution of the container 312. In various cases, the data privacy integration service may implement an obfuscation service 320, which may obfuscate performance metrics data 318 to produce obfuscated output 324 accessible to customers 302. In some cases, the obfuscation service 320 may generalize, remove, or modify various metrics to ensure data privacy is maintained when a customer 302 access performance metrics data, indicated via operations 422, 424, and 426 of process 400. While obfuscation is given as one example, other privacy techniques may be applied to the performance metrics data to ensure that no sensitive information is made available to customer 302. In various cases, the obfuscated performance metrics may include numerical or other values. In some examples, the performance metrics may include the name and type of each item, such as scalar or vector. An example performance metric set may look like the following:

{AUC: scalar, MAPE: vector}.

In some cases, obfuscation of the performance metrics may including adding one or more perturbed numerical values. For example:

AUC actual=0.86475, AUC_obfsucated=0.84

In some cases, the container 312 may execute the machine learning model or other executable instructions provided by the user 302 multiple times, where the output (user level data sets 314 and performance metrics 318) is written back into the secure execution environment 306 multiple times, prior to privacy controls being applied to the output, and made accessible to user 302. As used herein, secure execution environment 306 may include one or more software containers that isolate the input data, the container image, and the output data from external access. In some cases, the secure execution environment 306 may include or be an example of a clean room execution environment where multiple different actors or users can input data into the environment, where the raw input data is not accessible to the other users. Privacy controls may then be implemented on the output, to ensure that sensitive information that is contained in the input data and/or generated by the execution logic is not exposed outside of the clean room environment. In some cases, the input data may be pre-encrypted before it is uploaded to the environment. Once loaded into the environment, the data may be decrypted and operations run on the data. The results may then be returned or made accessible outside of the environment after being encrypted, to ensure data privacy is maintained. As used herein, a clean room environment may be a specific example of a secure exaction environment 306, where other implementations of secure execution environment 306 may not include all the controls as a clean room environment.

FIG. 5 illustrates an example process 500 for configuring a secure execution environment for performing operations on third party data. In various examples, process 500 may be performed by one or more of data privacy integration service 104, 216, a container service 210, and/or container 122, 236, and/or 312 described above in reference to FIGS. 1, 2, and 3. In various cases, the secure execution environment may be an example of or include one or more aspects of secure execution environment 122, 236, and/or container 312 described above in reference to FIGS. 1, 2, and 3.

Process 500 may begin at operation 502 in which a request to execute logic in a secure execution environment may be received. In some cases the request may also indicate an output data schema, identifying what data is desired as an output to executing logic on input data. In yet some cases, the request may include one or more parameters of the input data, including various fields or columns included in the data, date ranges of the data, or other aspects of the data that may be p[particularly useful to executing or performing the logic. Next, at operation 504, the execution logic may be obtained from a secure location, such as by a container. In some cases, where the logic is contained in a container image, the secure location may include a container or image repository, as described above. The container or secure execution environment may then be configured according to the request/container image (when available) and the output data schema, at operation 506.

The secure execution environment may then obtain input data, at operation 508, and may filter or scrub the data for personal identifiers and/or for sensitive information, at operation 510. The data fields or columns subject to filtering may be selected based on one or more of inputs to the customer supplied logic or ML models, one or more fields of the data output schema, or based on other factors. The secure execution environment may then ready to execute the operations in the customer supplied logic on the filtered input data to produce results, as indicated at operation 512.

Figure 6:
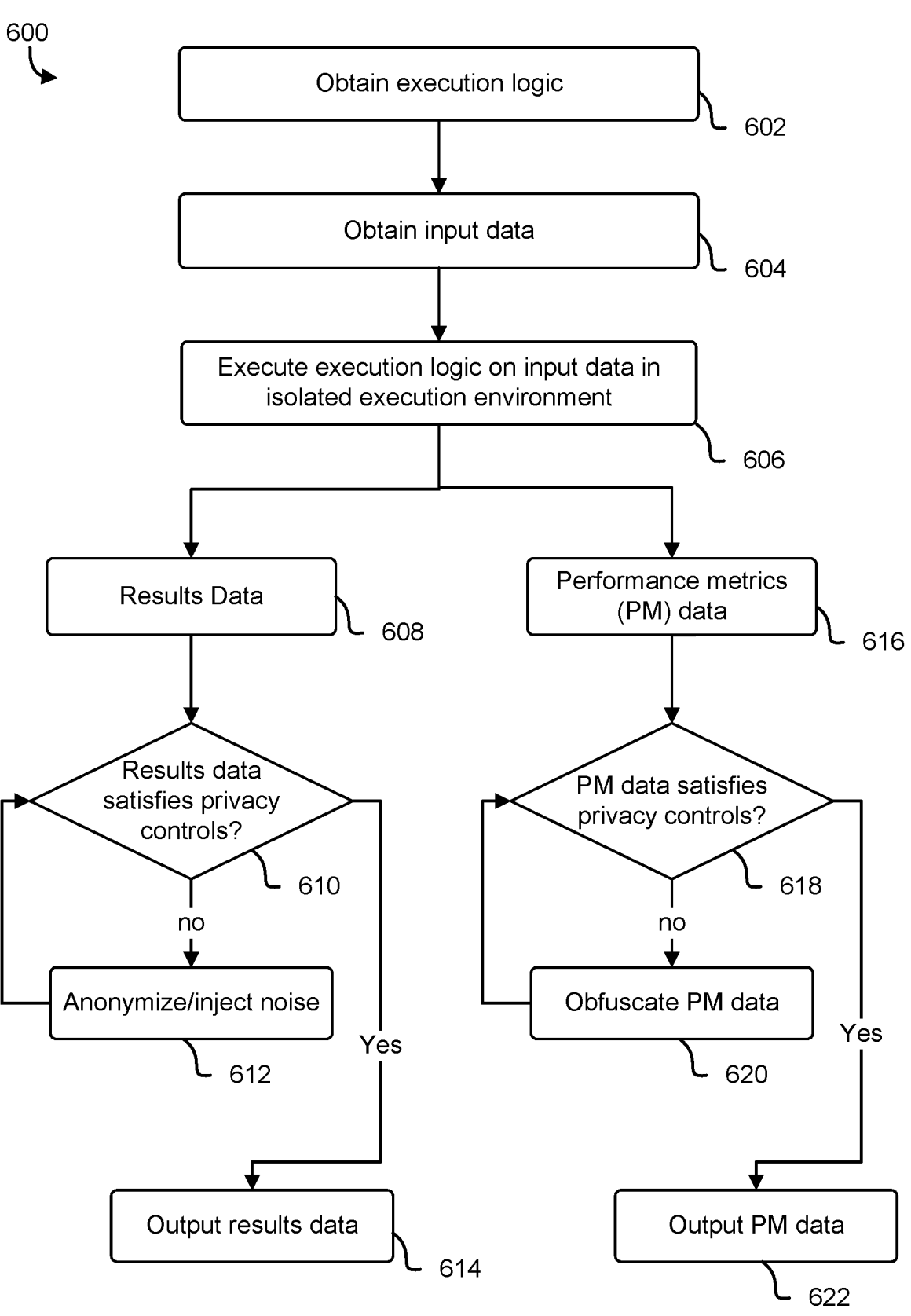
FIG. 6 illustrates another example process for performing operations on third party data and generating privacy compliant results and metrics, according to at least one embodiment.

FIG. 6 illustrates another example process 600 for performing operations on third party data and generating privacy compliant results and metrics. In some examples, one or more operations of process 600 may be performed by one or more of data privacy integration service 104, 216, a container service 210, and/or container 122, 236, and/or 312 described above in reference to FIGS. 1, 2, and 3.

In some cases, process 600 may begin at operation 602, in which execution logic defining one or more actions to be performed on input data, may be obtained. Next, at operation 604, input data may be obtained, such as from a data repository, which may include third party data and/or include sensitive information. The execution logic may then be performed on the input data, such as in as secure execution environment, at operation 606, to produce two different types of data, results data 608 and performance anml分

US 12,664,310 B1

13 metrics data 616. In some aspects, operations 602, 604, and 606 may be a simplified example of process 500 described above. In some cases, operations 602-606 may be replaced with process 500 described above.

Each of the results data and the performance metrics may each be analyzed separately to determine if they satisfy one or more privacy controls for the specific type of data, at operations 610 and 618 respectively. In some cases, different privacy controls may be implemented for the results data compared to for the performance metrics. As illustrated, if the results data do no satisfy the results data privacy controls, then the results data may be anonymized (generalized or suppressed), aggregated, and/or noise data added, at operation 612, iteratively, until the results data satisfies the one or more privacy controls, as described in greater detail above, at which point the modified results data may be output at operation 614. Similarly, the performance metrics data may be obfuscated at operation 620, if and iteratively util the performance metrics data satisfies the one or more privacy controls at operation 618, at which point the modified performance metrics may be output at operation 622.

Figure 7:
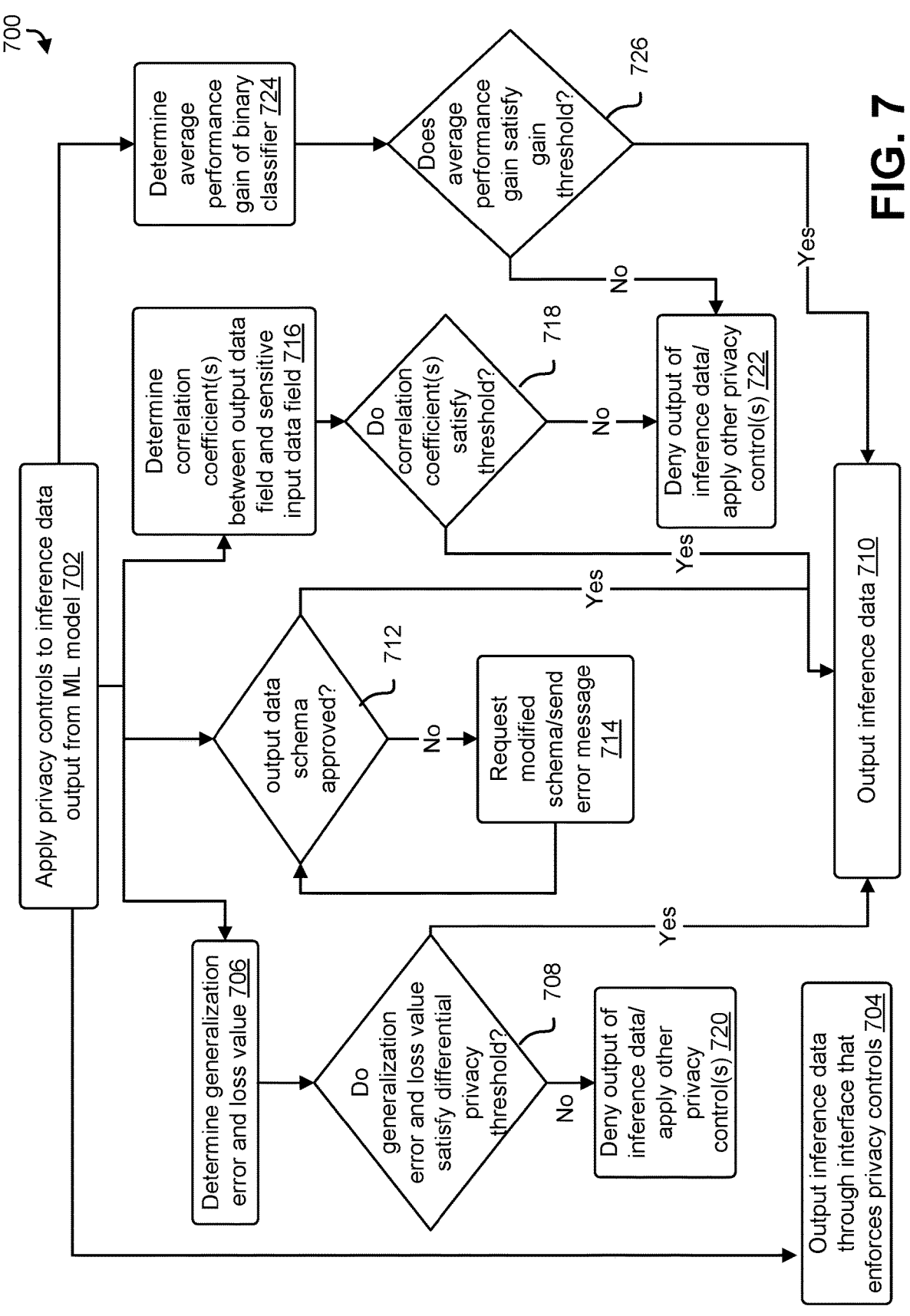
FIG. 7 illustrates an example process for implementing privacy controls on inference data, such as may be generated by a data privacy integration service, according to at least one embodiment.

FIG. 7 illustrates an example process for implementing privacy controls on inference data, such as may be generated by a data privacy integration service. In some examples, one or more operations of process 700 may be performed by one or more of data privacy integration service 104, 216, a container service 210, and/or container 122, 236, and/or 312 described above in reference to FIGS. 1, 2, and 3.

In some cases, process 700 may be performed on inference data output from a secure execution environment, based on inputting data into one or more ML models. One or multiple privacy controls may then be applied to the inference data prior to making it accessible to a customer or other entity, at operation 702. In some cases, different control methods may be implemented for ML inference data according to a level of egress or output data restrictions desired or tolerated.

Egress Aggregated ML Inference Results

In a first case, a most restrictive approach may include only releasing characteristics or values derived from the inference data to a customer. In this case, a customer carries out inference on the trained model in a secure execution environment. The inference results may include event level data. In these examples, the environment does not egress the inference results to customer directly. Instead, the environment uploads this data back into the secure execution environment/data privacy integration service, whereby customers can access the data through a interface, such as a UI or GUI. The compiler of the interface may then enforce privacy controls on what data is output to the customer. In this example, the customer can define an output data schema, whereby the data privacy integration service can approve or deny the schema, and if/once approved, assign column sensitivity to the inference dataset. This approach may only allow aggregated inference output. In some cases, the aggregate output may need to be above an aggregated threshold, such as 100 for columns with medium or higher sensitivity. This approach may be represented by operation 704.

Audit Privacy Risk for Supervised Learning Model

In some aspects, privacy risk of a supervised learning model may be directly linked connects to its generalization error. Generalization error is the loss function averaged over all datasets, including training and non-training dataset. The smaller the generation error, the lower risk for membership inference attacks (MIAs) attack and privacy. Membership inference tries to determine whether a data point is part of the model training dataset by inference on the model. An adversary uses MIA to identify if an individual is in a dataset. This is in analogy to the differential privacy and k-anonymity attacks in SQL query. Intuitively, higher generation error means overfitting. Overfitting means model remembers each training record precisely. It leads to different inference behavior for training dataset and non-training dataset. Thus, an adversary observes the inference output to figure out if one record in training dataset or not.

The relation between MIA privacy risk and ML model generalization error may be modeled by the following equation, which It defines generalization error of a machine learning algorithm A on training dataset S of size n sampled from population D as:

$$R_{gen}(A, n, D, l) = E_{S \sim D^n, z \sim D}[l(A_S, z)] - E_{S \sim D^n, z \sim S}[l(A_S, z)]$$

where $A_s$ is trained model over training dataset S, and l is the loss function. In MIA, an adversary estimates if z is from training dataset S or general population D. The membership advantage of this adversary is:

$$\text{Adv} = \Pr[\hat{A} = 0 | b = 0] - \Pr[\hat{A} = 0 | b = 1]$$

where b=0 means z is in S, b=1 means z is in D, and $\hat{A} = 0$ means the adversary estimate z is in S. The Adv$\in [-1, 1]$ describes how much information an adversary get from a MIA attack. The larger its value, the stronger the MIA attack. Random guess leads to Adv=0, while a perfect attack has Adv=1. For a $\epsilon$-differential private learning algorithm Adv$\leq e\epsilon-1$, and if the loss function 1 is bounded Adv=Rgen/max(l). Thus to enforce a $\epsilon$-differential privacy on the ML model, its generalization error should satisfy $$\frac{R_{gen}}{\max(l)} \leq e^x - 1$$

where The left side of the inequity is the generalization error normalized to the max loss value during its calculation.

The larger the $\epsilon$ value, the higher the privacy risk. Privacy risk of a customer ML container may be estimated according to the following steps.

First an $\epsilon$ threshold may be selected, in similar approach as 100 may be determined as the threshold for aggregation. Next the model feature and label schema may be obtained, such as from a customer. In addition, the customer may define the training data, such as by specifying time_window_start and time_window_end, to complete the training of the ML model. The generalization error Rgen and maximum loss value max (loss) may then be calculated by inference over non-training datasets on the trained model. Examples of loss functions are cross entropy for classification model and MSE (mean square error) for regression. The actual loss function used may not be disclosed to the customer to prevent counter attacks.

If $$\frac{R_{gn}}{\max(\text{loss})} \leq e^{\xi - 1},$$

customer proceeds to inference on the trained model and may obtain all its output unrestricted. Otherwise, the model may be rejected, and customer can neither inference on it, nor get any output.

Although this method allows unrestricted inference output, it adds additional overhead in time and computation resources to estimate privacy risk. Moreover, generalization error estimation is a sufficient but not necessary condition for MIA. It means this method may not cover all possible MIA attack vectors. However, it increase the barrier to carry out such attack. This is similar to k-anonymity checking in the prior technique. While this method may not prevent all attack vectors, it will increase the barrier. This approach is captured in process 700 as operations 706 and 708, whereby the approved inference data may be output at operation 710. If the inference data/ML model does not meet the privacy control, then the inference data may not be output to the customer or another privacy control of control may be implemented to ensure that no sensitive information is provided with the inference data to the customer, as captured at operation 720.

Egress Format Governance

While the Audit Privacy Risk for Supervised Learning model or method described above only estimates the privacy risk of MIA for a ML model, it does not control the data output format.

In many cases, it may be useful to restrict the inference output to not include any high sensitive columns or data fields. For example, output format of {id: adsUserId, score: predicted propensity} may not be desirable. Egress format governance on the outputs from the environment may be provided via one of two main approaches. A first approach may include reviewing the customer disclosed output format (e.g., output data schema), and rejecting the format if any highly sensitive data is included in the set of fields or columns of the output data. An example of this type of control is described in reference to process 400 as operations 408 and 410. In various examples, these operations may also be included in process 700, as operations 712, 714

The second one is to calculate the correlation coefficient among output columns and high sensitive columns of the input data. The ML model may be rejected if the correlation coefficient is larger than a predetermined threshold. In some examples, correlation calculation may only apply to numerical columns. For string columns, these column values may be hashed into numerical values before correlation calculation. For categorical columns, these column values may be transformed into one-hot vectors before correlation calculation. These techniques may be captured by operations 716 and 718 in process 700, where the data inference data may be output at operation 710 if it satisfies the correlation coefficient threshold(s). If the inference data/ML model does not meet the privacy control, then the inference data may not be output to the customer or another privacy control of control may be implemented to ensure that no sensitive information is provided with the inference data to the customer, as captured at operation 722.

In some examples, this correlation estimation step may become an extension to the Audit Privacy Risk for Supervised Learning model step with additional time and computation overhead, such that operations 706 and 708 may be performed in addition to operations 716 and 718. The concern of this method is that it is really only effective if there is no transformation on the high sensitive columns. If the output only has a subset of the high sensitive columns, or transform them, such as reverse adsUserId string, correlation won't detect such malicious behavior.

Differential Private Optimizer in Training

In some aspects, SGD (stochastic gradient decent) may be used to achieve differential privacy in ML training. Adding noise (inert or artificial data) is a standard approach for privacy protection at the cost of accuracy, and may be used as a differential privacy control to ensure that sensitive information is not output using the described systems (e.g., implemented using a differential privacy threshold for determining how much noise data to enter into one or both of the input data and/or output data). While this method is not specifically illustrated in process 700, it may be implemented as an additional process between operations 702 and 710.

Audit Arbitrary Computation

In some cases, another method may be utilized to help ensure that data output form an ML model meets one or more privacy constraints. In this technique, the customer logic or ML model may be represented by a function f(x), where x is the input to the compute or inference container. D_in and D_out, may representing the training and non-training dataset used for ML training. A binary classification model M may be trained using feature vector [x, f(x)] and corresponding labels {D_in, D_out}. The performance gain of M from a random classifier may represent the privacy risk gain of the computation container. This performance gain may be measured using standard binary classification metrics, such as AUC or F1 score. The privacy risk of the ML container may be rejected or accepted based on comparing M's performance gain with a predetermined threshold, such as represented in process 700 as operations 724 and 726. This threshold represents the privacy risk that is acceptable. This technique may provide a point estimation of privacy risk of the container. It may be performed multiple times to determine whether a given container represents an acceptable privacy risk to allow inference data to be output to a customer.

It should be appreciated that any of the various techniques for ensuring data privacy described above in relation to process 700 may be implemented individually, and/or combined to provide a robust privacy control system for performing operations on third party data including in some cases sensitive data, and output results therefrom and/or performance metrics. In some cases, one or more of the described techniques may be implemented in conjunction with other data privacy controls, such as anonymization, ensuring diversity, and/or differential privacy as described in greater detail above. While process 700 is described in terms of outputs from one or more ML models, many of the techniques are equally applicable to other customer logic, as will be apparent to those having ordinary skill in the relevant art.

Figure 8:
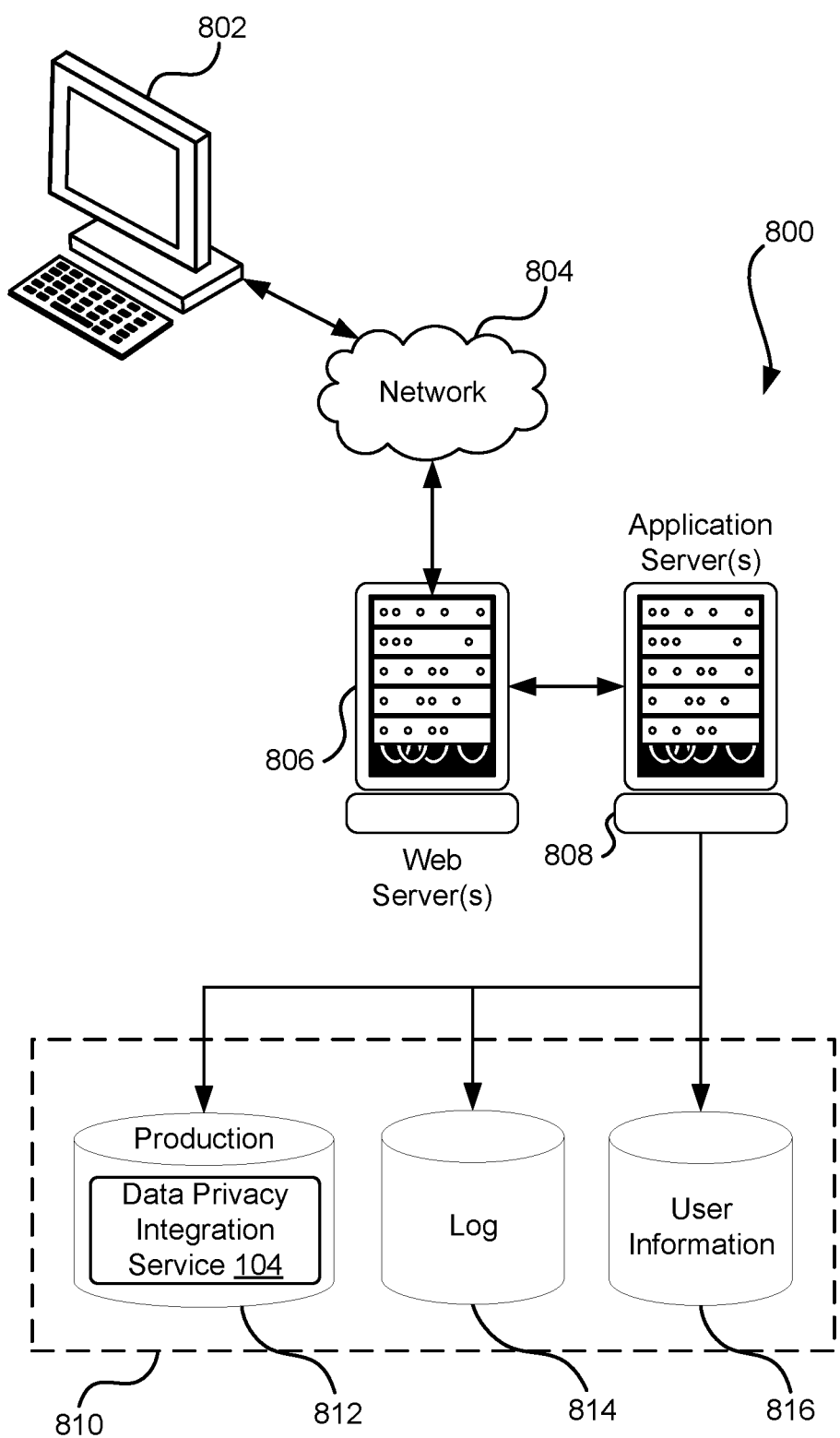
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810. In various cases, the product data 812 may include data for instantiating a data privacy service, such as data privacy integration service 104 described above.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as JavaR, C, C#or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer implemented method comprising:
obtaining, by a clean room execution environment instance provided by a data privacy integration service, an identifier of a container image from a client device, the container image comprising at least one machine learning model that generates inference data for multi-touch attribution data, wherein code defining the container image is not accessible by or through the data privacy integration service;
obtaining an output data schema from the client device, the output data schema defining a set of fields of the inference data;
obtaining, by the clean room execution environment instance, sensitive data from a data storage service, at least a portion of the sensitive data not associated with or accessible by the client device;
executing the at least one machine learning model in the clean room execution environment instance using the sensitive data to generate the inference data including the set of fields of the output data schema and performance metrics data; and
enforcing a set of privacy constraints on the inference data and the performance metrics data prior to causing the inference data and the performance metrics data to be accessible to the client device via an interface provided by the data privacy integration service, wherein enforcing the set of privacy constrains comprises verifying that the inference data in the set of fields defined in the output data schema satisfy the set of privacy constraints.

2. The computer-implemented method of claim 1, wherein enforcing a set of privacy constraints on the inference data prior to causing the inference data to be accessible by the client device further comprises aggregating multiple sets of the inference data within the clean room execution environment instance to satisfy at least one sensitivity threshold for at least one field of the inference data.

3. The computer-implemented method of claim 1, wherein enforcing the set of privacy constraints on the performance metrics data prior to causing the performance metrics data to be accessible by the client device further comprises obfuscating the performance metrics data by modifying at least one of the performance metrics.

4. The computer-implemented method of claim 1, further comprising: removing at least one field containing sensitive information from the sensitive data prior to inputting the sensitive data into the at least one machine learning model.

5. The computer-implemented method of claim 1, further comprising: selecting a set of privacy controls from a plurality of sets of privacy controls
based on at least one of a first geographical location associated with the sensitive data or a second geographical location associated with where the inference data and the performance metrics data is made accessible to the client device.

6. A system, comprising:
one or more processors;
memory that stores computer-executable instructions that, if executed, cause the one or more processors to:
obtain, by an isolated execution environment provided by a data privacy integration service, execution logic from a client device for generating result data based on input data, wherein the execution logic is not accessible by or through the data privacy integration service;
obtain, by the isolated execution environment, the input data comprising data not accessible by the client device;
execute the execution logic in the isolated execution environment using the input data to generate the result data and performance metrics data relating to the execution logic; and
enforce a set of privacy constraints on the result data and the performance metrics data prior to causing the result data and the performance metrics data to be accessible by the client device.

7. The system of claim 6, wherein the computer-executable instructions that, if executed, further cause the one or more processors to:
obtain an output data schema from the client device, the output data schema defining a set of data fields in the result data, and wherein enforcing the set of privacy constraints on the result data further comprises determining that the set of fields do not include any high sensitivity data fields.

8. The system of claim 6, wherein the computer-executable instructions that, if executed, cause the one or more processors to enforce a set of privacy constraints on the result data, further cause the one or more processors to:
aggregate the result data to satisfy at least one aggregation threshold.

9. The system of claim 8, wherein the computer-executable instructions that, if executed, cause the one or more processors to enforce a set of privacy constraints on the performance metrics data, further cause the one or more processors to:
obfuscate or truncate the performance metrics data.

10. The system of claim 8, wherein the computer-executable instructions that, if executed, cause the one or more processors to enforce a set of privacy constraints on the performance metrics data, further cause the one or more processors to:
apply at least one layer of processing on the performance metrics data to generate modified performance metrics data prior to causing the modified performance metrics data to be accessible to the client device.

11. The system of claim 8, wherein a first data privacy control is applied to the result data and a second privacy control is applied to the performance metrics data.

12. The system of claim 6, wherein the execution logic comprises at least one machine learning model, and wherein the result data comprises inference data generated using the at least one machine learning model.

13. The system of claim 12, wherein the computer-executable instructions that, if executed, cause the one or more processors to enforce a set of privacy constraints on the result data, further cause the one or more processors to:

determine a generalization error and a loss value of the result data; and based on comparing the generalization error and the loss value to a differential privacy threshold, determine whether to make the result data available to the client device.

14. The system of claim 12, wherein the computer-executable instructions that, if executed, cause the one or more processors to enforce a set of privacy constraints on the result data, further cause the one or more processors to:

determine at least one correlation coefficient between an output data field in the result data and an input data field containing sensitive data in the input data; and based on comparing the at least one correlation coefficient to at least one correlation threshold, determine whether to make the result data available to the client device.

15. The system of claim 12, wherein the computer-executable instructions that, if executed, cause the one or more processors to enforce a set of privacy constraints on the result data, further cause the one or more processors to:

inject noise into at least one of the input data or the result data to meet at least one differential privacy constraint.

16. The system of claim 12, wherein the computer-executable instructions that, if executed, cause the one or more processors to enforce a set of privacy constraints on the result data, further cause the one or more processors to:

determine at least one performance gain of a binary classifier based on the execution logic and the input data; and based on comparing the at least one performance gain to at least one performance threshold, determine whether to make the result data available to the client device.

17. One or more non-transitory computer-readable storage media storing thereon executable instructions that, as a result of being executed by one or more processors of a computer system, cause the computer system to at least:

obtain, by an isolated execution environment provided by a data privacy integration service, execution logic from a client device for generating result data based on input data, wherein the execution logic is isolated from the data privacy integration service;

obtain, by the isolated execution environment instance, the input data comprising data isolated from the client device;

execute the execution logic in the isolated execution environment using the input data to generate the result data and performance metrics data relating to the execution logic; and enforce a set of privacy constraints on the result data and the performance metrics data prior to causing the result data and the performance metrics data to be accessible by the client device through an interface provided by the data privacy integration service.

18. The one or more non-transitory computer-readable storage media of claim 17, wherein at least one first data privacy control is applied to the result data and at least one second privacy control is applied to the performance metrics data.

19. The one or more non-transitory computer-readable storage media of claim 17, wherein the instructions further include instructions that cause the computer system to: anonymize the result data prior to making the result data accessible to the client device via the interface.

20. The one or more non-transitory computer-readable storage media of claim 17, wherein the instructions further include instructions that cause the computer system to: inject noise into at least one of the input data or the result data to meet at least one differential privacy constraint.

* * * * *